United States Patent [19]

Butera

[11] 4,443,138
[45] * Apr. 17, 1984

[54] DOWELING JIG

[76] Inventor: Anthony W. Butera, 112 Tuthill St., Port Jefferson, N.Y. 11777

[*] Notice: The portion of the term of this patent subsequent to Mar. 22, 2000 has been disclaimed.

[21] Appl. No.: 334,555

[22] Filed: Dec. 28, 1981

Related U.S. Application Data

[63] Continuation-in-part of Ser. No. 96,753, Nov. 23, 1979, abandoned.

[51] Int. Cl.³ .............................................. B23B 47/28
[52] U.S. Cl. .............................. 408/115 R; 408/103
[58] Field of Search .............. 408/72 R, 72 B, 115 R, 408/115 B, 104, 108, 112, 103

[56] References Cited

U.S. PATENT DOCUMENTS

| 928,657 | 7/1909 | Howell | 269/93 |
| 2,260,784 | 10/1941 | Morton | 408/103 |
| 2,651,951 | 9/1953 | Valtenburger | 408/115 X |
| 2,778,393 | 1/1957 | Golasowski | 269/249 |
| 2,836,087 | 5/1958 | Ehresmann | 408/115 |
| 3,082,651 | 3/1963 | Patrick | 408/72 |
| 3,464,296 | 9/1969 | Harper | 408/115 |
| 3,934,316 | 1/1976 | Driscoll | 269/249 X |
| 4,093,394 | 6/1978 | Adams | 408/115 |
| 4,145,160 | 3/1979 | Wiggins | 408/103 |
| 4,153,384 | 5/1979 | Isaken | 408/103 |

FOREIGN PATENT DOCUMENTS

| 661633 | 4/1963 | Canada | 408/115 |
| 463820 | 7/1928 | Fed. Rep. of Germany | 408/72 |
| 417236 | of 1947 | Italy | 408/115 |
| 370570 | 4/1932 | United Kingdom | 408/72 |
| 372598 | 5/1932 | United Kingdom | 408/72 |

Primary Examiner—Robert E. Garrett
Assistant Examiner—Jerry Kearns
Attorney, Agent, or Firm—Anthony W. Butera

[57] ABSTRACT

This invention relates to a "T" shaped doweling jig and an attachable convertible clamp device for holding a work part. The doweling jig is comprised of a drill bit guide hole member and a base plate. The drill bit guide hole member is provided with at least one defined drill bit guide hole which is interchangeable with other guide hole members and provides a range of defined drill bit diameter guide holes. The base is provided with at least one alignment port hole, cut-outs and alignment indicies that correspond with said guide holes, and provides for the correct positioning and clamping of the doweling jig over the work part, and the subsequent passing of the drill bit through a guide hole in one direction to drill the first work part, and consecutively to pass the drill bit through the same guide hole in the opposite direction to drill a mirror image hole in a second work part. The convertible clamp is used in a "C" shape configuration to drill holes in work parts to be joined in a side-to-side relation or is converted to a "Z" shape configuration to drill holes in work parts to be joined in a non planar right angle relation. The Accu-Template is also facilitates using a simple c clamp or a new type L shaped clamp for clamping the work part to the Accu-Template in right angle relation applications.

20 Claims, 42 Drawing Figures

SECTION A-A

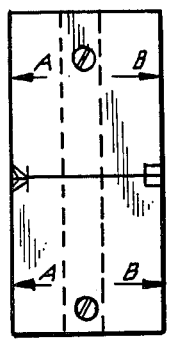 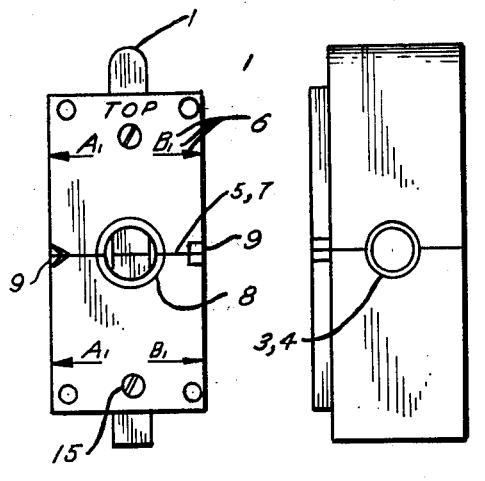 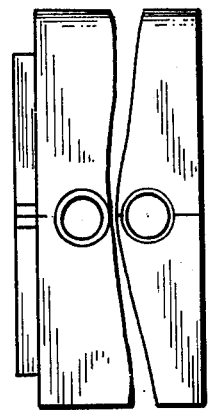
FIG. 6    FIG. 7    FIG. 8
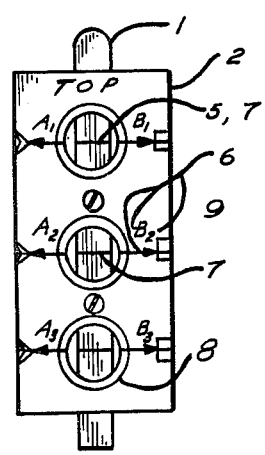 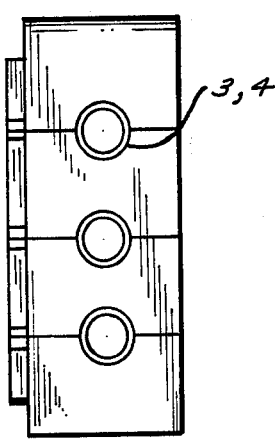
FIG. 7a    FIG. 8a

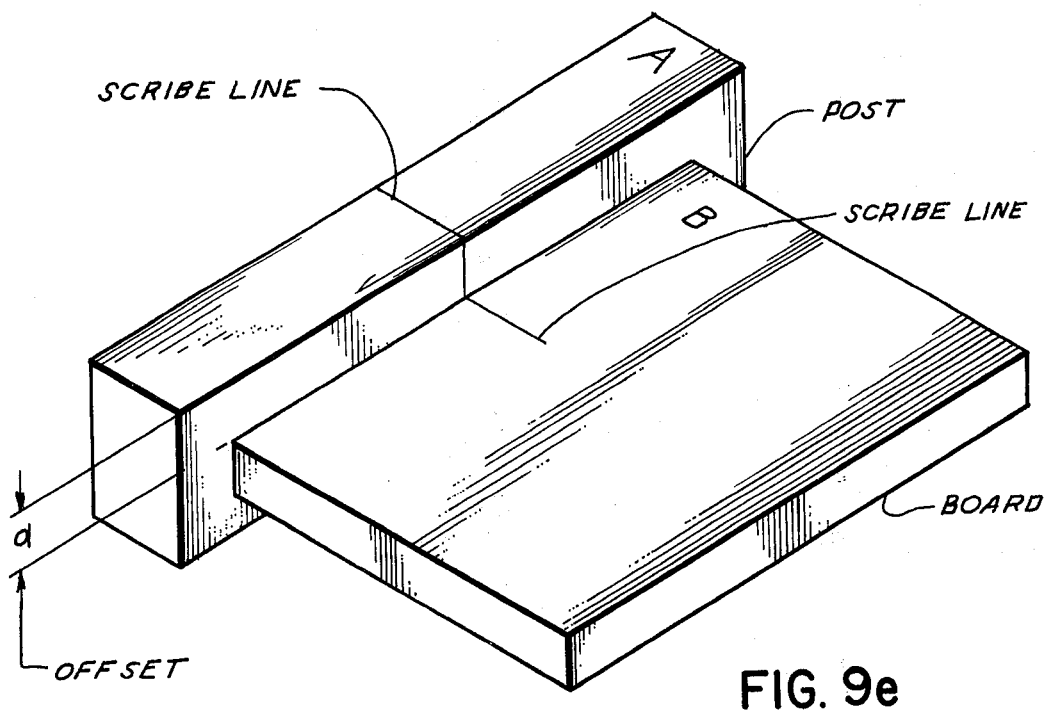
FIG. 9e
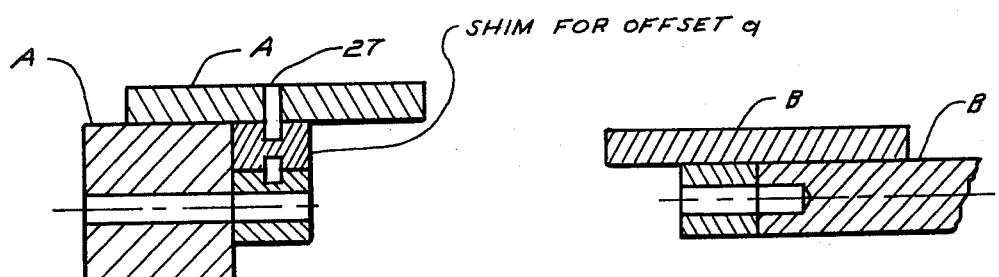
FIG. 9g
FIG. 9f

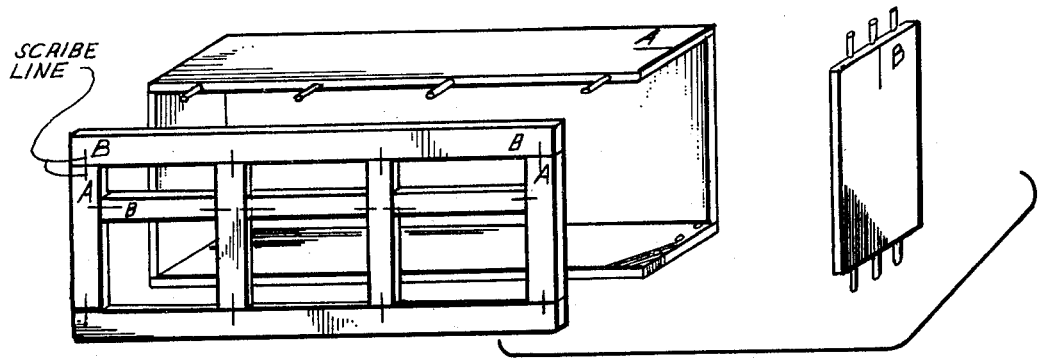
FIG. 14
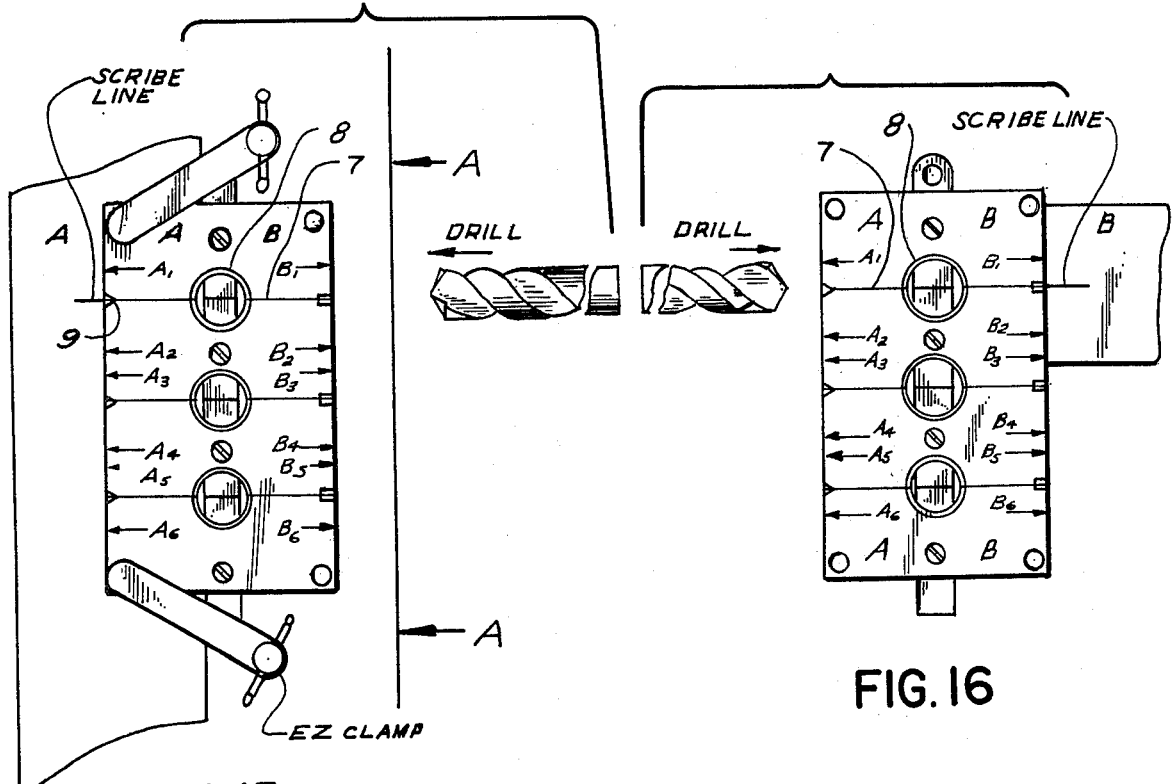
FIG. 15
FIG. 16
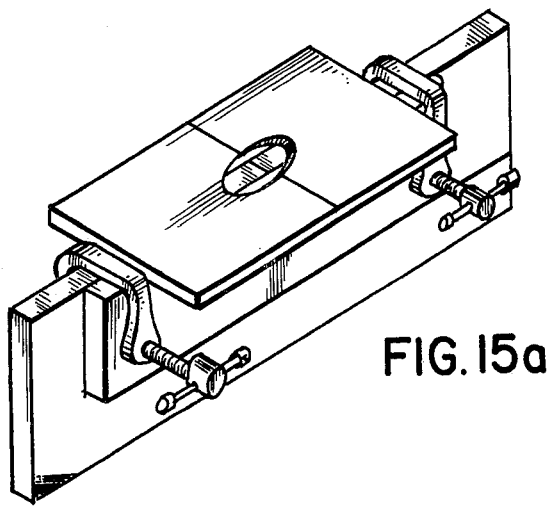
FIG. 15a

DOWELING JIG

This application is a continuation-in-part of Ser. No. 96,753 filed Nov. 23, 1979 and now abandoned.

BACKGROUND OF THE INVENTION

Difficulty has always been encountered when two pieces of material are to be joined accurately together by dowels. The principle difficulty has been in the alignment of the two mating parts that are to be butt joined together and the subsequent drilling of holes in the two mating parts, such that after the holes are drilled and the dowels are inserted in the holes and the two mating parts are joined, the union and surfaces of each mating part will be true and flush with each other. Such accuracy is difficult to achieve with present state of the art dowel drilling jigs wherein said jig is used first on one mating piece and then turned around and used on the opposite mating piece to locate and drill the said opposite mating dowel holes. Herein is one of the main difficulties. That is, when the jig is turned around and used on the mating part any deviation from symmetry of the drill bit guide hole jig or any errors of alignment, or angles of drilling the holes of the first work part, are doubled when drilling a second dowel hole in the second mating work part.

Consequently, in the final assembly of the two parts, any misalignment of the dowel holes of the mating parts due to said assymetricies or operator error, can result in misalignment of the work parts as well as cause bending and stress in the dowels after final assembly of the mating parts. In the hands of a skilled craftsman, the current devices can be used successfully, but only with time-consuming effort and care. Another difficulty of existing dowel jigs is that they cover the work piece and therefore injects guesswork as to where the drill bit will penetrate the work piece.

SUMMARY OF THE INVENTION

This invention relates to a device to provide for the matching and flush assembly of two mating parts and for the subsequent drilling of a hole in each part such that a dowel inserted and common to both parts will insure that the two parts can be easily and accurately assembled. Simply put, it is the purpose and object of my invention to provide a simple jig (called an Accu-Template) with the use thereof, to obtain precise alignment for the drilling of holes in mating parts so that in the final assembly of the work parts the surfaces and joints of the said parts will be flush and in accurate alignment with each other as a replica of the initial assembly and that both the dowels and work parts are left without any residual internal bending strains and stresses due to misalignment. This invention greatly simplifies any previous method of dowel drilling operation and is an improvement by which a relatively unskilled operator can use visual indicias as aids to quickly achieve accurate results. An additional feature of this invention is that the Accu-Template is used to drill mirror image holes; and therefore does not have to be manufactured to an accurate symmetrical configuration and to close tolerances. Furthermore, the novelty of this invention combines a "T" shaped device and a simple sequence of operational steps so used that it automatically takes into account any manufacturing inaccuracies or deviations from symmetry of the device or any operator errors and passes these same inaccuracies on to the mating parts in a way that will negate any said inaccuracies of the jig and operator.

Another advantage of the Accu-Template combines a set of Alignment Indicia Aids with a feature similar to a see-through overlay or decal wherein an alignment port hole or a cut-out provides a visual alignment of a girth line on the Accu-Template with a scribe line on a work part while at the same time a keyed indicia of the Accu-Template A, is "arrowed" at a like indicia A on Part A and assures the user that the proper portion of the "Top" face has been chosen so as to insure the subsequent drilling of a mirror image hole in the second work part. The letters A and B have been selected as examples of any polyonymous indicia which can serve the same purpose. These features are most important in the production of cabinet frames with multiple combination of rails, and divider parts. These features also advantageously enable the user to "dry run" an assembly, mark the cross joints with a scribe line, label each work part, and then use the Accu-Template and its intrinsic Alignment Indicia Aids to drill mating dowel holes. Thus identical reassembly is assured and the possibility of reversing the Accu-Template or a mix up of parts is precluded. No where in any prior art can be found any intent to consider the combination of "keyed" indicias and see-through alignment aids with a mirror image principle to drill dowel holes in mating parts.

Another objective of the Accu-Template is to provide means with an attachable clamp, whereby the clamp configuration can be changed by a simple rotation of one of the parts of the said clamp to suit its use in drilling dowel holes in parts to be joined in a side-by-side or non-planar right-angle relation. A clamp already attached to the Accu-Template is an advantage and avoids juggling a loose C clamp and work part preparatory to drilling operations. Another advantage is that the drill bit guide hole member is removable and interchangeable with other drill bit guide hole members of various sizes containing various size drill bit guide holes. Therefore, because of the simplicity of construction, the Accu-Template can exist in kit form with a plurality of interchangeable parts that can cheaply and readily supply the needs of a myriad of dowel joined applications. Another salient feature of the Accu-Template is that the "T" shape configuration allows any one of a variety of commercially available C clamps to be used instead of the EZ clamp to hold the work parts during drilling operations. In addition, the Accu-Template has no moving parts, can be made out of commonly available stock material including plastics and steel insets to provide a built-in accuracy amenable to reproducability, being either the Accu-Template itself, or mass production of mating parts requiring the moving around of the Accu-Template as well as a plurality of parts required in drilling operations and assemblies.

Also, the Accu-Template can be used on work pieces which are offset from one another such as corner post and board correspondence found in furniture with an insertable shim between the base plate and the guide hole member.

BRIEF DESCRIPTION OF THE DRAWINGS

FIG. 6 is a top plan view of a single drill bit guide hole Accu-Template with the ends of the blade and base plate flush with each other and alignment opposed cutouts.

FIG. 7 is a top plan and side view of a single drill bit guide hole Accu-Template as in FIG. 6 with the guide hole member extended.

FIG. 7a is a side view of FIG. 7 and shows a plurality of guide holes located next to one another.

FIG. 8 is a side view of FIG. 7 and shows a plurality of drill bit guide holes one above the other.

FIG. 8a shows a side view of the combination of FIG. 7a, and FIG. 8.

FIG. 9g is a perspective view of a simple L clamp with a screw clamp and an oblong opening.

FIG. 9e shows a perspective view of two work pieces of different thicknesses whereby the surface of one work piece (post) is offset from the surface of the mating work piece (board).

FIG. 9f shows a partial cross section of the Accu-Template aligned with side B of the Accu-Template mounted on work piece B, and shows the drill bit guide hole aligned with a dowel hole in said work piece.

FIG. 9h shows a partial cross section of the Accu-Template with side A of the Accu-Template mounted on work piece A; shown is a shim to increase the depth so as to gauge the drill hole in the post to be in correspondence with the dowel hole in the board FIG. 9f. Note: a tapered shim may also be used as shown in the sketch 9d.

FIG. 14 is a perspective exploded view of a typical kitchen cabinet showing a sample construction of an arrangement of frame divider parts and boards, whereby the Accu-Template is used for drilling dowel holes in frame parts and boards to be joined in a side-to-side or non-planar right-angle relation.

FIG. 15 is a schematic illustration of the use of the Accu-Template FIG. 11 as shown on FIG. 14, and clamped with an EZ clamp to a mating work part A, whereby the alignment hole 8 and triangular cut-out 9 provides a visual alignment of the inscribed drill bit guide hole girth line 7 on the Accu-Template with a scribe line on part A while at the same time the keyed Indicia "A" 6 of the Accu-Template is "arrowed" 6 at like Indicia "A" on part A.

FIG. 16 is a schematic illustration of the application of the mirror image drilling of the dowel holes on the opposite mating work piece B, FIG. 14, whereby the keyed indicia B 6 of the Accu-Template is "arrowed" 6 at the like indicia B on part B while at the same time the inscribed girth line 7 is visible in in the alignment hole 8 as well as by the rectangular cut-out 9 is aligned with the scribe line on the mating part B.

FIG. 15a shows an alternate means of clamping the Accu-Template to the work piece utilizing the extended portion of the Accu-Template and a conventional C clamp; also, other commercially available clamps can be used including clamps that are of the quick release type.

NOTE: FIGS. 9a,b,c,d, shows an oblong alighment port hole structure whereas elswhere is shown a single alignment hole structure. It is to be understood that any alignment opening is the objective and whether said opening is oblong, singular, or dual or etc., the objective of said opening is to provide a viaual aid in the alignment and matching the girth line on the Accu-Template with the scribe line on the work piece.

DETAILED DESCRIPTION OF THE INVENTION

Figure 1:
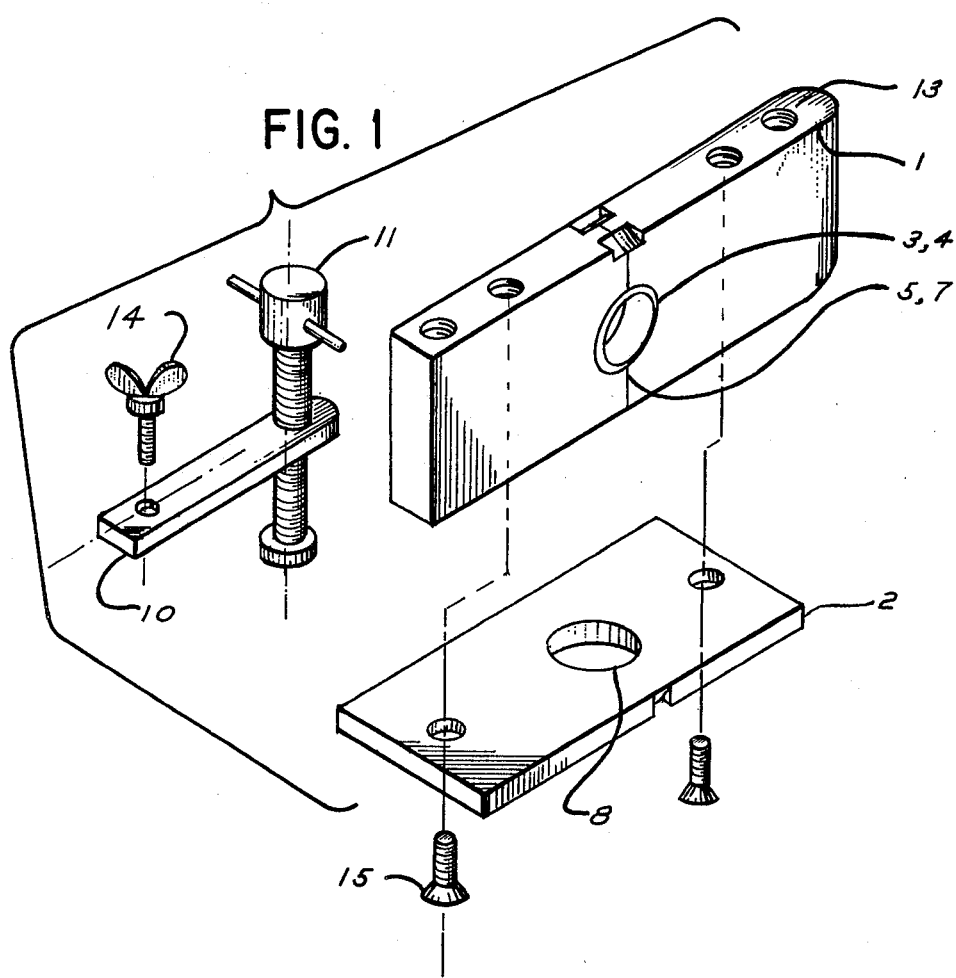
FIG. 1 is a perspective exploded view of a single drill bit guide hole Accu-Template including the base portion of an attachable EZ clamp base.
Figure 2:
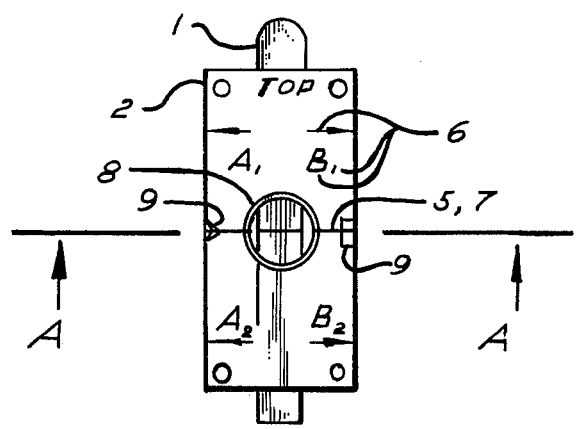
FIG. 2 is a top plan view of a single drill bit pilot hole Accu-Template as shown in FIG. 1 and shows a set of Alignment Indicia Aids including letters, numbers, arrows a port hole girth line, a guide hole girth line, cutouts and a alignment port hole.
Figure 2A:
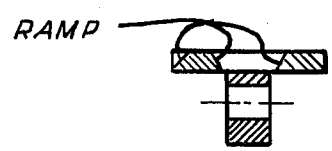
Figure 3:
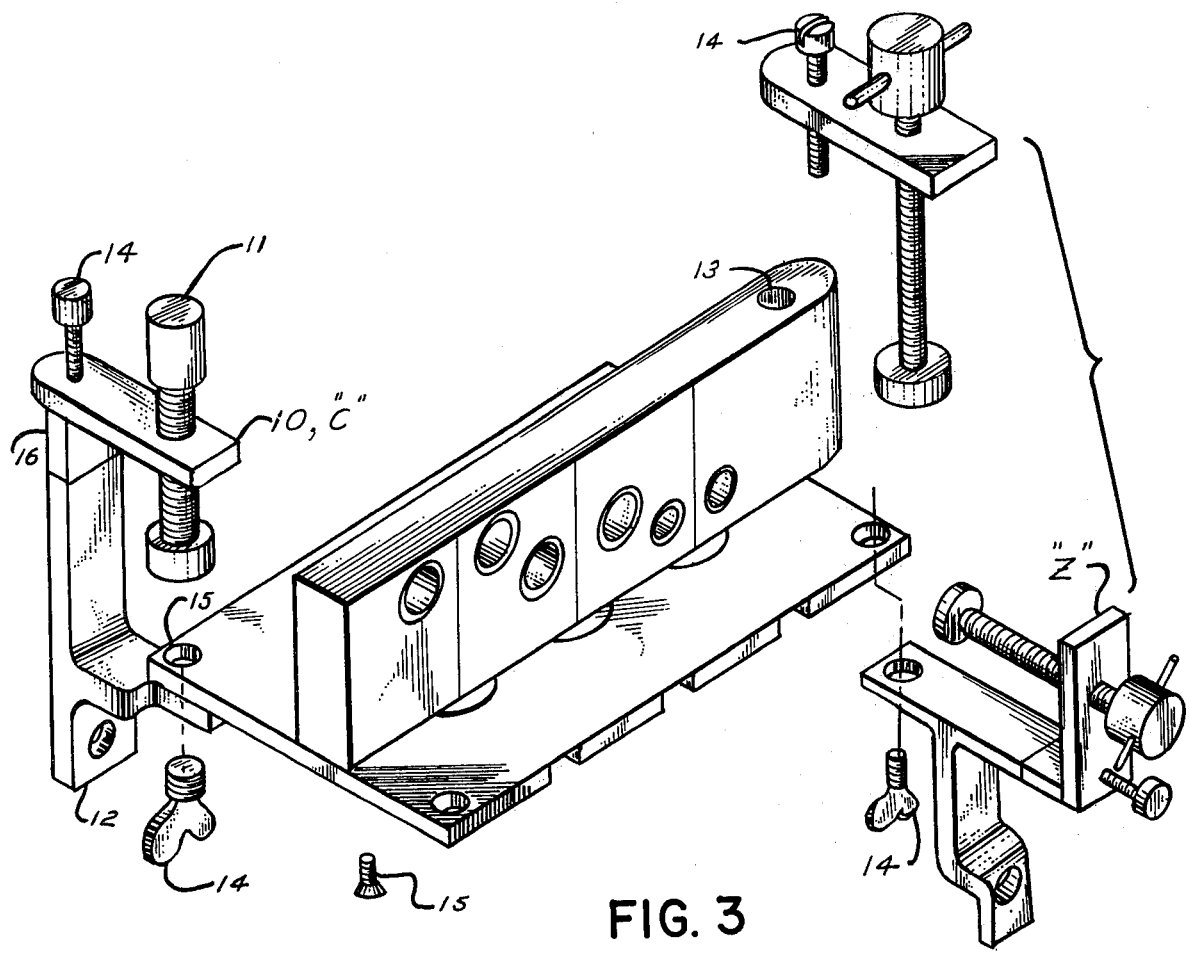
FIG. 3 is a perspective view of an Accu-Template with a plurality of stepped drill bit guide holes and an attachable EZ clamp in the "C" and "Z" configuration.
Figure 4:
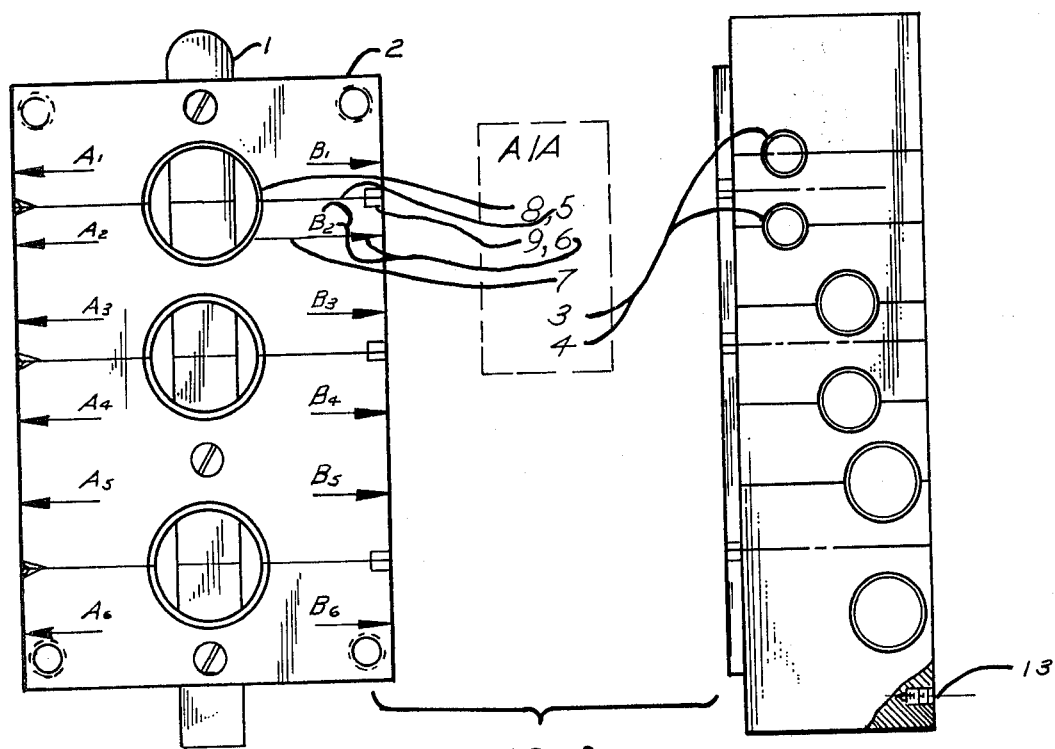
FIG. 4 is a top plan view of the Accu-Template as shown in FIG. 3 with a plurality of drill bit guide holes and the corresponding sets of AIA.

The following FIGS. 1–25a show variations of a basic "T" shaped Accu-Template and its uses in typical cabinetry construction consisting of a base plate attached to a drill bit guide hole member, whereby the said member is interchangeable with said base and is provided with means defining at least one drill bit guide hole corresponding to a range of drill bit diameters and a set of allied Alignment Indicia Aids. All the Accu-Template figures carry basically the same constituents, their order and arrangements differing only to complete an anticipated spectrum of uses.

FIGS. 3,4,9,9a,b,c, show an embodiment of the Accu-Template which includes the salient features common to the following figures shown in the specification including FIGS. 1,2,3,4,6,7,7a,8,8a,9,10,11,12,13,22–25b. A base plate 2 is attached by screw thread 13 to a drill bit guide hole member 1 with a base plate attachment screw 15. The drill bit guide hole 3 is shown with inserts 4, preferably of steel, carried transversely in the said member 1 and centrally located with a drill bit guide hole girth line 7 circumferentially scoring each surface of the Accu-Template and in juxtaposition with a set of AIA including (numbers, letters, arrows) 6, and cut-outs 9 located on the top surface of the Accu-Template also shown concurrently with the guide hole girth line 5 bisecting an alignment port hole 8 and circumferentially scoring each surface of the Accu-Template thereby defining a basic building block. The alignment port hole 8 has tapered sidewalls and is formed to a geometric shape by a countersink tool or the like, transversely piercing the top of the base plate and shapes the sides of the alignment hole in a ramp like relation to the top part, said cut-outs are geometrically shaped and formed as applicable with a triangular, or end mill machining tool or an applicably shaped file or the like to form a geometrically shaped ramp cut-out.

Figure 5A:
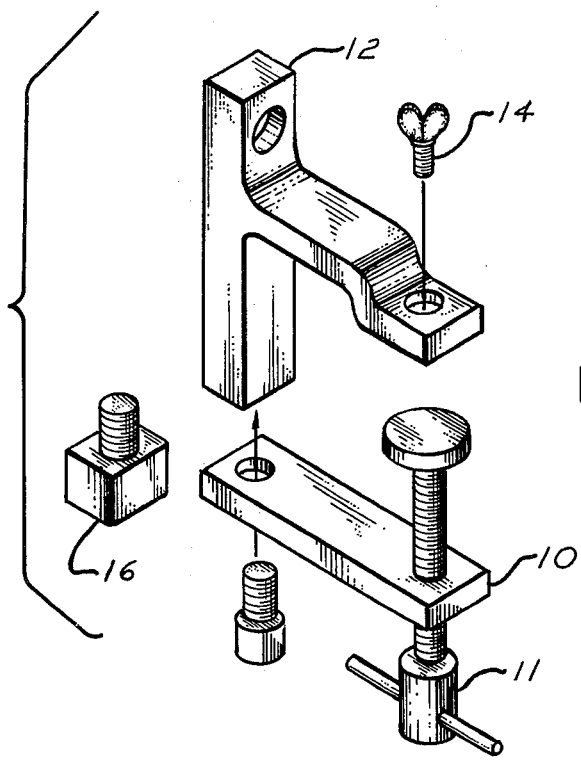
FIG. 5 is a perspective exploded view of the EZ clamp showing both the "C" clamp and "Z" clamp configuration respectively.
Figure 5B:
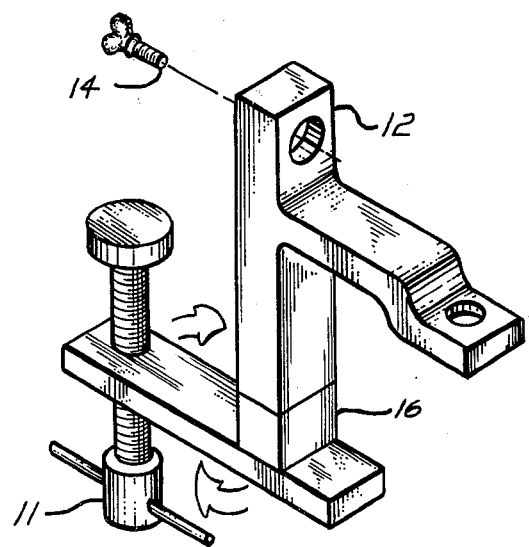

FIG. 5 shows an EZ clamp in three different configurations for use in clamping the work part to the Accu-Template, whereby the said work parts are to be joined in a side-to-side or right-angle relation to one another. FIG. 5a shows a C clamp arrangement, whereby an EZ clamp base 10 carries an EZ clamp extension 16 and an EZ clamp frame 12 respectively with an EZ clamp attachment means 13, whereby the base 10 is positioned so that the clamp screw 11 is in line with the EZ clamp attachment means 15 carried in a perpendicular cantilever component projecting outwardly from said frame 12, therefore creating a C clamp configuration for use in joining boards in a side-to-side relation FIG. 18b. FIG. 5b shows the base 10 rotated 180° in relation to the frame 12 so that a "Z" shape is formed. In this configuration the EZ clamp is used to drill dowel holes in boards to be joined in a right-angle relation to one another FIG. 18a.

Figure 18A:
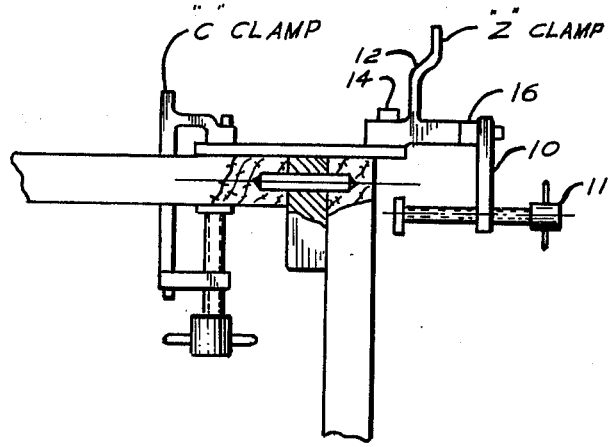
FIG. 18a is a schematic form showing the "Z" clamp configuration whereby the EZ clamp and "Z" clamp configuration in unison form a conventional C clamp— principle of operation.
Figure 19:
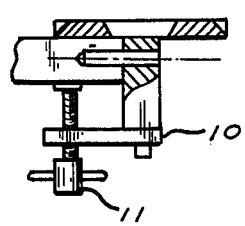
FIG. 19 shows use of the EZ clamp base, or similar clamp means, as a substitute for the "C" clamp configuration in FIG. 18.

FIG. 1 shows the base 10 apart from the EZ clamp frame 12 and is used in this configuration to clamp boards to be drilled for dowel holes in a side-to-side relation. FIGS. 9a,9b, are similar to FIG. 9 and are perspective views of the Accu-Template and shows its use as applicable for work pieces to be drilled, doweled and joined in either a side to side or non-planar right angle relation to each other. Also shown in FIG. 9b is a simple "L" shaped clamp assembly 20 for holding the work piece to the Accu-Template for joining boards in said right angle relation. The simple clamp can be used instead of the "Z" clamp configuration as shown in FIG. 18a, or a conventional clamp as shown in FIG. 15a. The alignment port hole 8 is shown as an oblong geometric configuration and of length and breadth to make visible in said port hole 8 the guide hole girth lines 7 and the alignment port hole guide lines 5 located on the guide member 1. Said oblong port hole 8 is an advantage because it provides the user with an opening whereby the drill bit can be directed visually into the center of the drill bit guide hole 3. The simple clamp 20 also contains an oblong slot and preserves the same see through alignment features of the port hole. Also shown on the top surface of the base plate is an imprinted scale. This scale can be used as a built in "square" since the base plate and guide member are square to each other.

Figure 9:
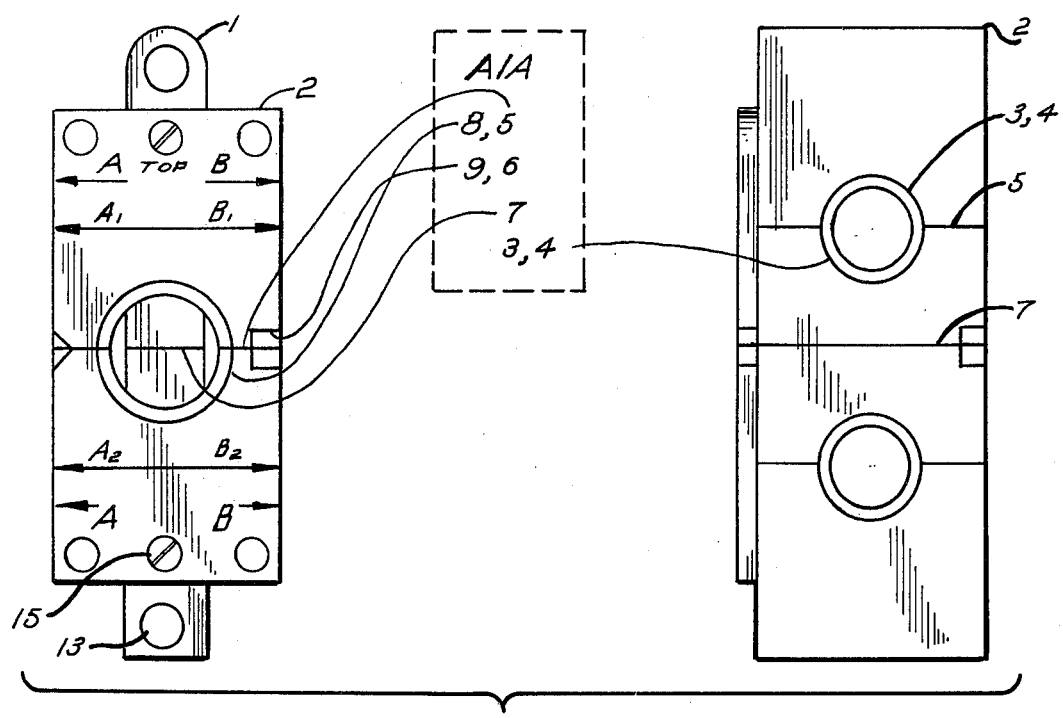
FIG. 9 is a top plan and side view of an Accu-Template with a group of two drill bit guide holes located next to one another and shows a typical application of a set of AIA in correspondence with drill bit guide holes commonly used in frames of cabinetry. Said FIG. 9 also shows a configuration of the Accu-Template with the salient features common to all Accu-Templates and constitutes a Basic Building Block.
Figure 10:
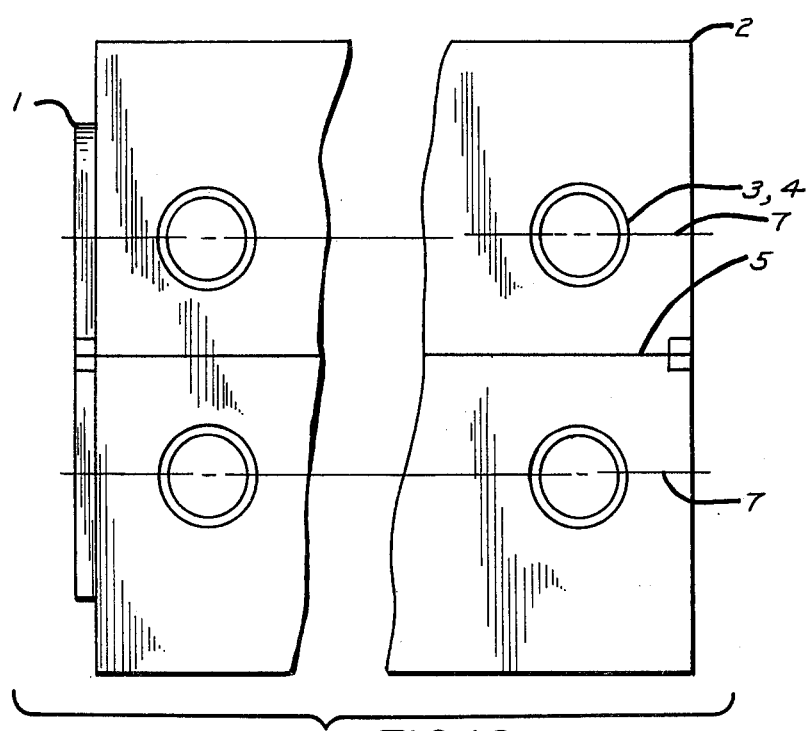
FIG. 10 is a side view of FIG. 9 and shows a plurality of sets of two drill bit guide holes located one above the other.
Figure 9A:
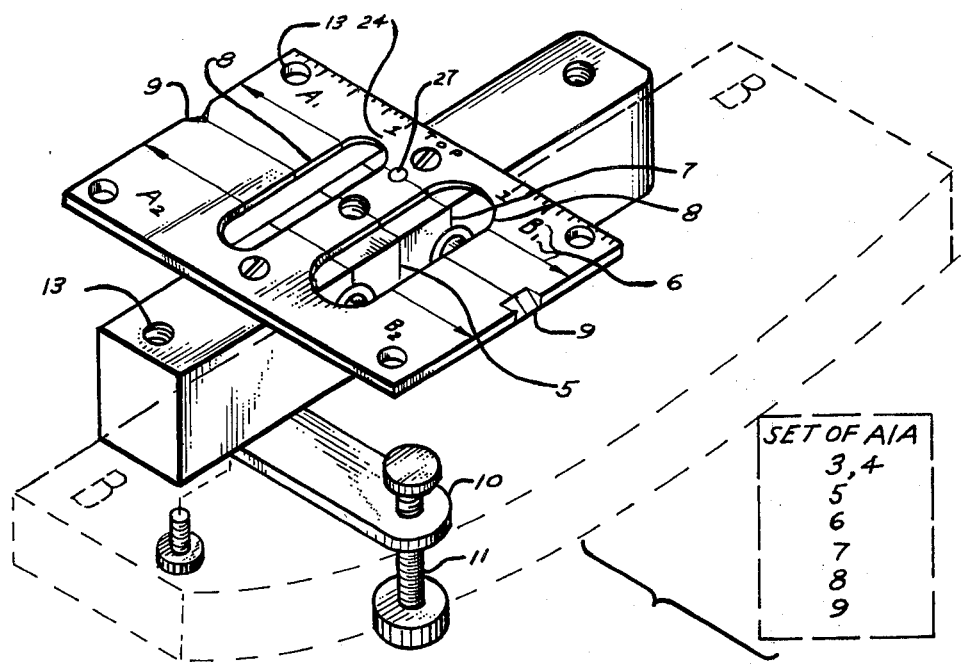
FIGS. 9a, 9b, are perspective views of the Accu-Template and are similar to FIG. 9, and shows the alignment port hole as an oblong geometric form along with two simple clamps; each of said clamp consists of a simple bar like construction.
Figure 9B:
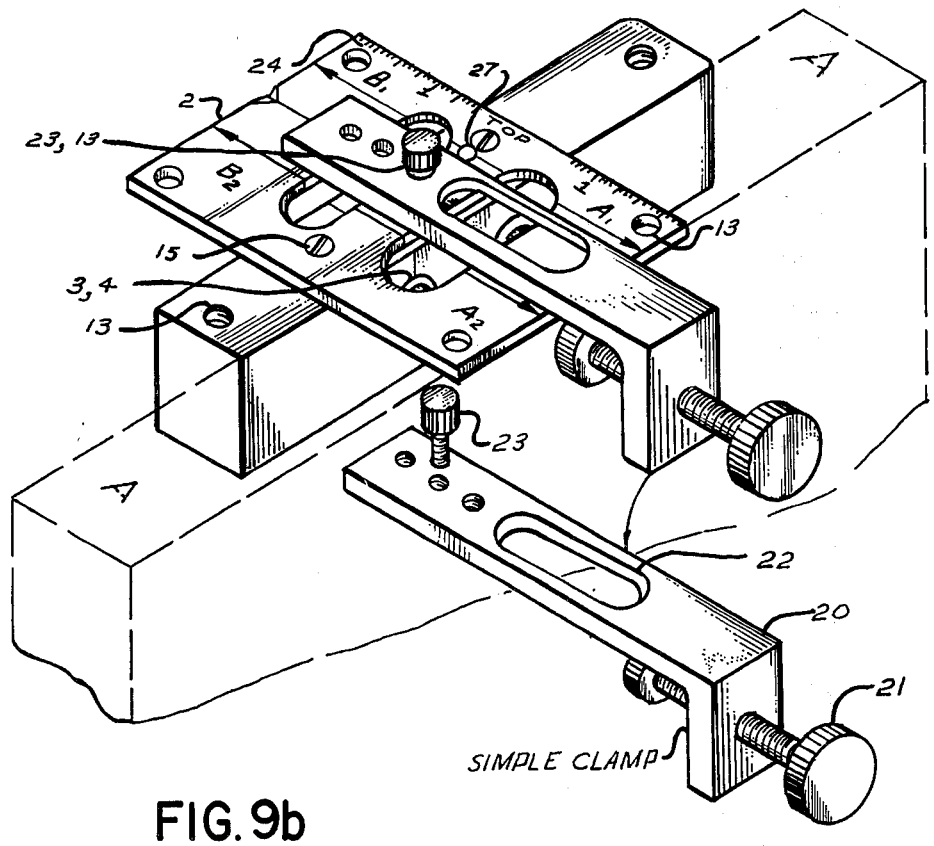
Figure 9C:
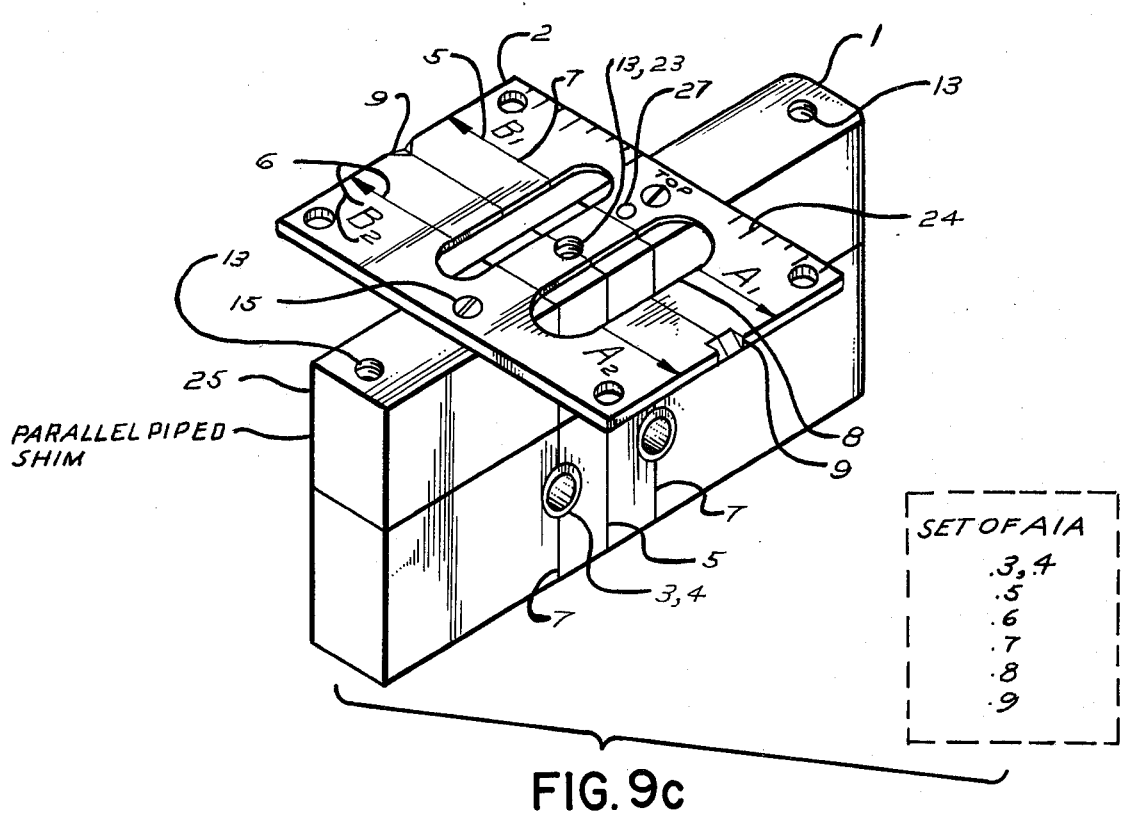
FIG. 9c is a perspective view of the Accu-Template and shows a parrelepiped shaped shim inserted between the base plate and the drill bit guide hole member.

FIGS. 9a,9b, are similar to FIG. 9 and are perspective views of the Accu-Template and shows its use as applicable for work pieces to be drilled, doweled and joined in either a side to side or non-planar right angle relation to each other. Also shown in FIG. 9b is a simple "L" shaped clamp assembly 20 for holding the work piece to the Accu-Template for joining boards in said right angle relation. The simple clamp can be used instead of the "Z" clamp configuration as shown in FIG. 18a, or a conventional clamp as shown in FIG. 15a. The alignment port hole 8 is shown as an oblong geometric configuration and of length and breadth to make visible in said port hole 8 the guide hole girth lines 7 and the alignment port hole guide lines 5 located on the guide member 1. Said oblong port hole 8 is an advantage because it provides the user with an opening whereby the drill bit can be directed visually into the center of the drill bit guide hole 3. The simple clamp 20 also contains an oblong slot and preserves the same see through alignment features of the port hole. Also shown on the top surface of the base plate is an imprinted scale. This scale can be used as a built in "square" since the base plate and guide member are square to each other.

Figure 9D:
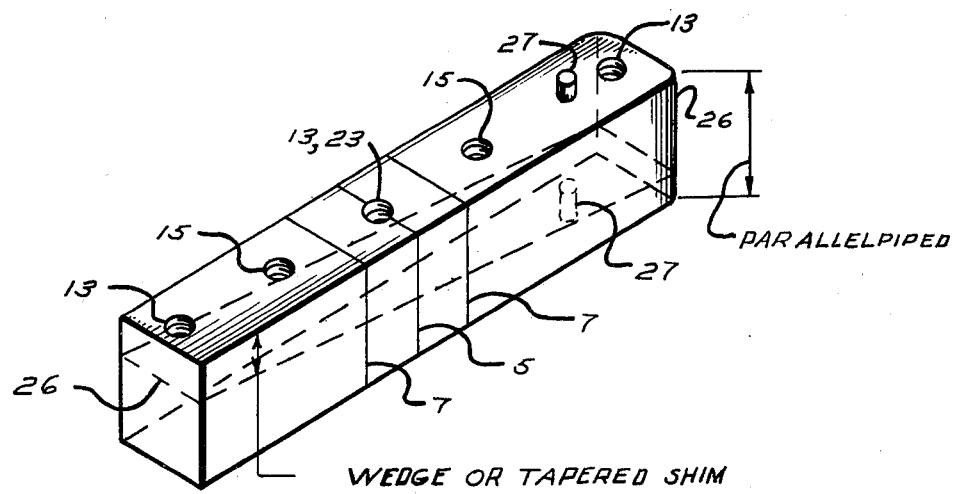
FIG. 9d is a perspective view of the shim
Figure 11:
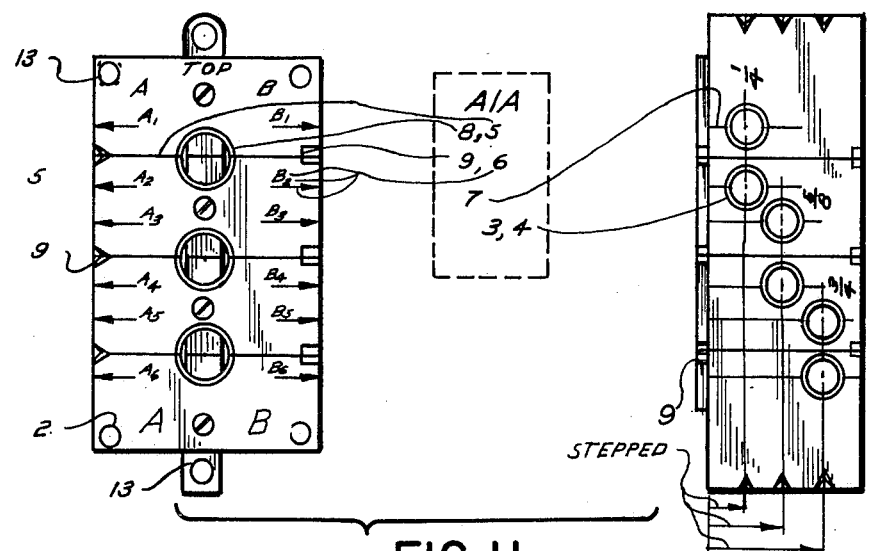
FIG. 11 is a top plan and side view of the Accu-Template showing a plurality of groups of various size drill bit guide holes stepped in relation to the base plate to match the center of a series of commercially available lumber thicknesses similar to FIG. 3 and FIG. 4.
Figure 12:
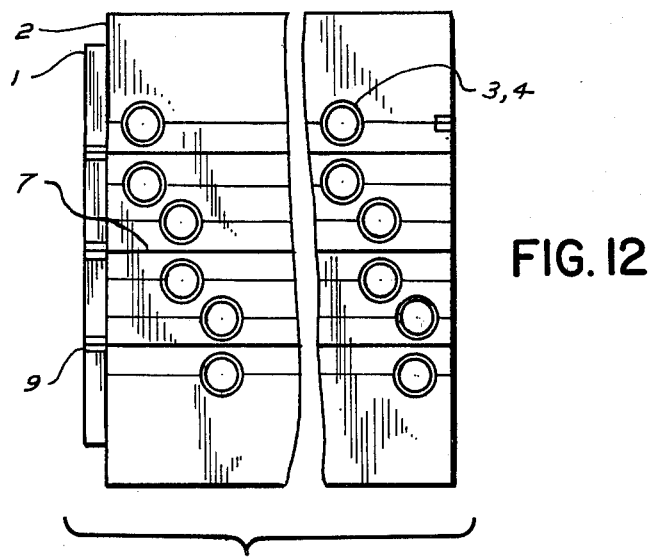
FIG. 12 is a side view of FIG. 11 and shows the Accu-Template with a plurality of stepped drill bit guide holes located one above the other.
Figure 13:
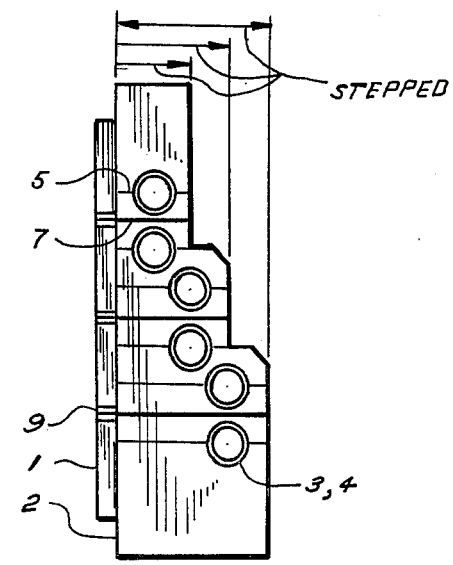
FIG. 13 is a side view of FIG. 11 and shows the lower end of the drill bit guide hole member stepped away from the base in relation to standard board thicknesses.
Figure 17:
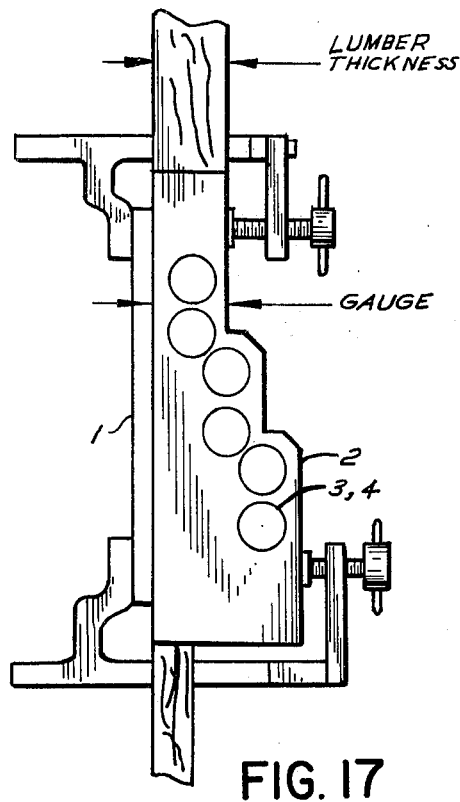
FIG. 17 is a side view of FIG. 15 illustrating the use of a stepped Accu-Template to gauge the thickness of a board and determine the corresponding drill bit guide holes.

Whereby in drilling operations of the non-planar right angle relation FIG. 14, Joint #2 a simple L shaped clamp FIG. 9g is applicable and consists of a flat substantially rectangular bar 20a with a right angle bend on one end and perpendicular thereto a headed screw 21 or simple clamp screw clamp is threaded through said end to form in abutement with a work piece and an end plate 20b, clamp action to hold the work piece to the Accu-Template, whereby said L clamp 20 contains a longitudinal clearance opening 22 on the top surface and on the other end an opening to attach the L clamp to the Accu-Template. FIG. 9e is an example illustrating the use of the Accu-Template in an application where it is necessary to gauge the location of the drill guides a greater distance from the edge of a work piece; as an example, where an offset is to be made between mating work pieces such as a corner post and a board found in a chair. For an offset of an arbitrary distance a, then a shim of height a inserted between the base plate 2 and the guide member 1 guided by alignment pin means 27 will compensate for the offset. The mirror image principle can still be adhered to for an offset that is tapered, as some legs of are found in furniture; in this case a tapered wedge shaped shim can be used as shown in the dotted line in FIG. 9d. The shim is also provided with alignment port hole girth lines 5 and drill bit guide hole girth lines 7 and clearance holes 25 to correspond in template projection with the same as on the top surface of the drill bit guide hole member 1. The shim 9d is held between the base plate 2 and guide member 1 with screws 15. Proper orientation of the base plate 2 and member 1 is assured with an alignment pin means 27. The pin 27 is attached in the top surface of the guide 2, and upon assembly with the base plate 1 is passed through a clearance alignment hole 28.

Figure 18B:
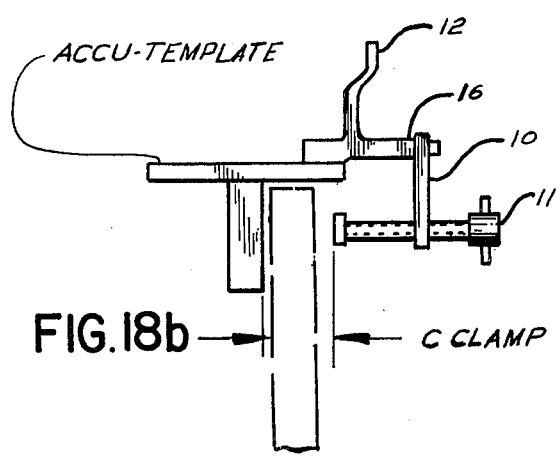
FIG. 18 is a cross section of the top and side boards of FIG. 14 and illustrates the use of the Accu-Template in drilling dowel holes in boards to be joined next to one another and at non-planar right angles to one another. Also illustrated is the convertible feature of the EZ clamp and its application in drilling dowel holes in boards to be joined in a side-to-side or right-angle relation to one another.
Figure 20:
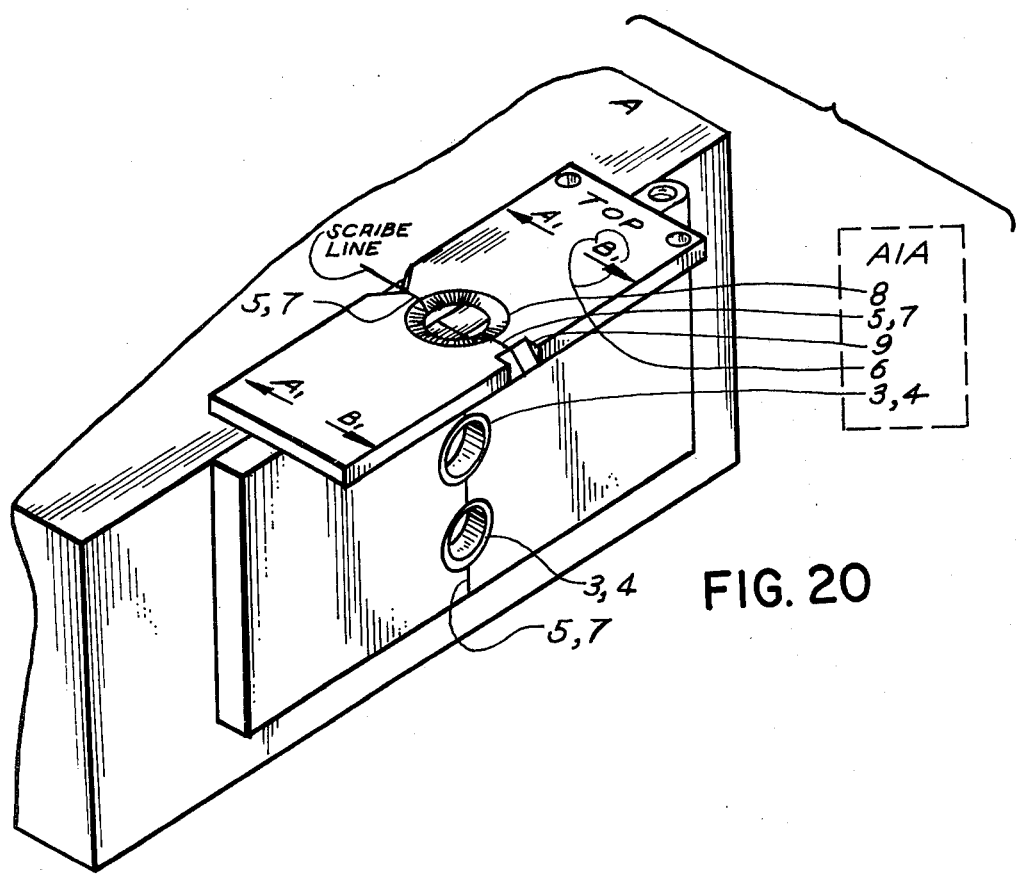
FIG. 20 is a perspective view of the Accu-Template, FIG. 8, in use to drill dowel holes one above the other in large beams.
Figure 21:
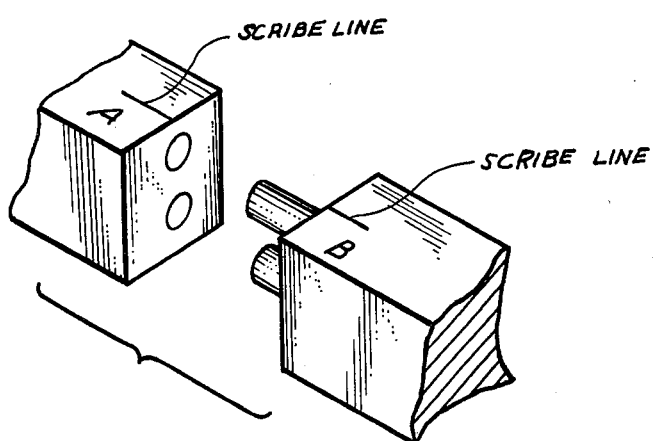
FIG. 21 is a perspective view of two large beams showing the location of dowel holes and dowels.
Figure 22:
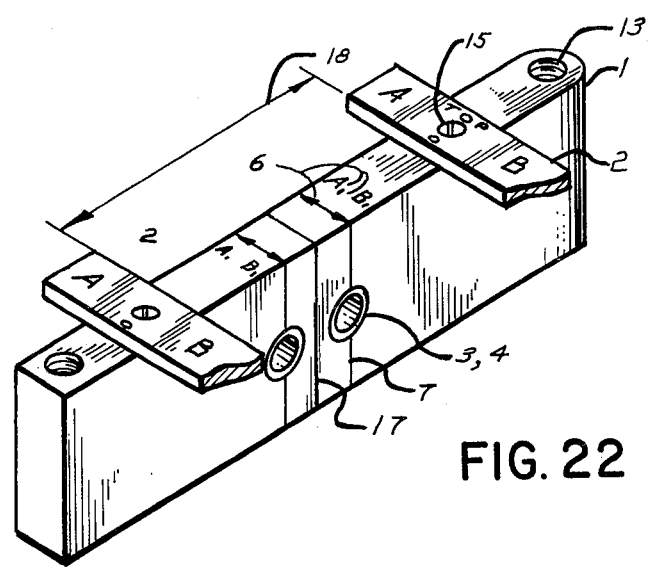
FIG. 22 is a perspective view of an Accu-Template with a plurality of drill bit guide holes in correspondence with a set of Alignment Indicias Aids and an alignment girth line, a drill bit guide hole, girth line and two base plates.
Figures 23, 23A:
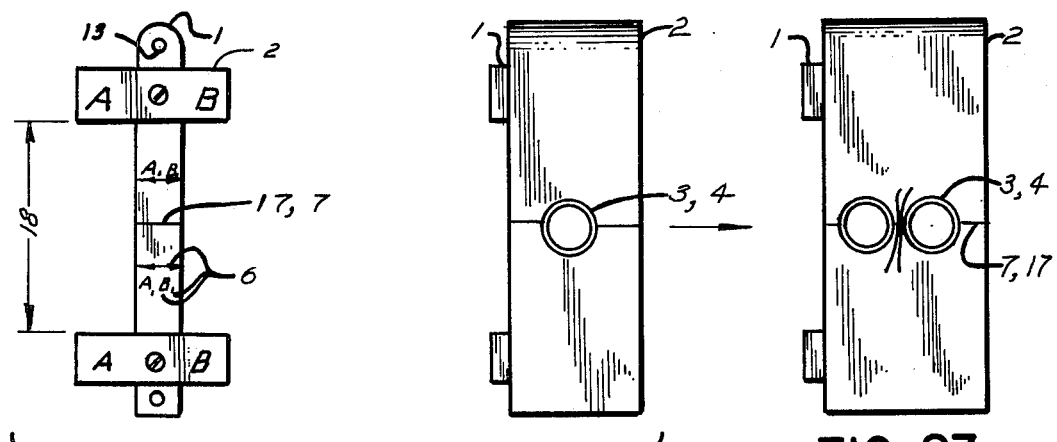
FIG. 23 is a top plan view and a side view of an Accu-Template in accordance with FIG. 22 and shows a single drill bit guide hole.
FIG. 23a is a side view of the Accu-Template as in FIG. 23 and shows a plurality of drill bit guide holes one below the other.
Figures 24, 24A:
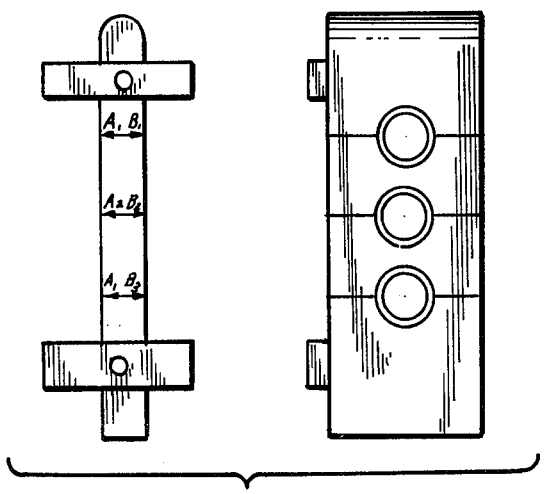
FIG. 24 is a top plan view and side view of an Accu-Template and shows a plurality of drill bit guide holes next to one another.
FIG. 24a is a side view of the Accu-Template, FIG. 24, and shows a plurality of drill bit guide holes located one below the other.
Figure 25:
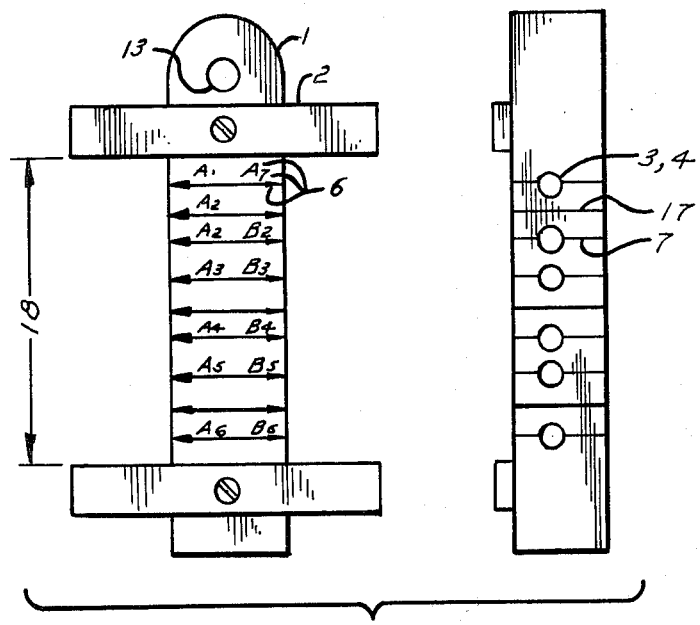
FIG. 25, 25a, is a top plan and side view of an Accu-Template and shows a plurality of groups of various size drill bit guide holes in line or stepped in relation to the base plate to match the center of a series of commercially available lumber thicknesses.
Figure 25A:
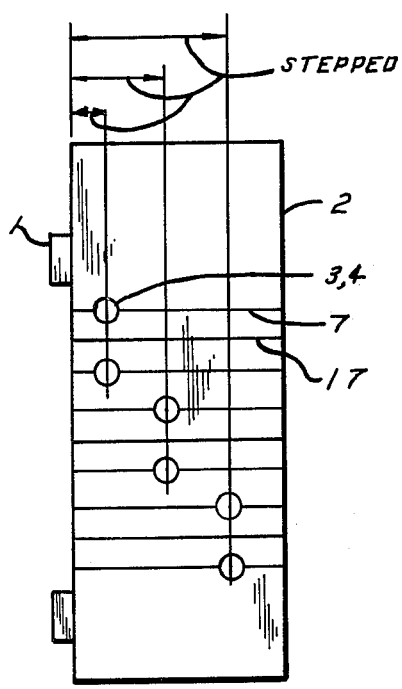
Figure 25B:
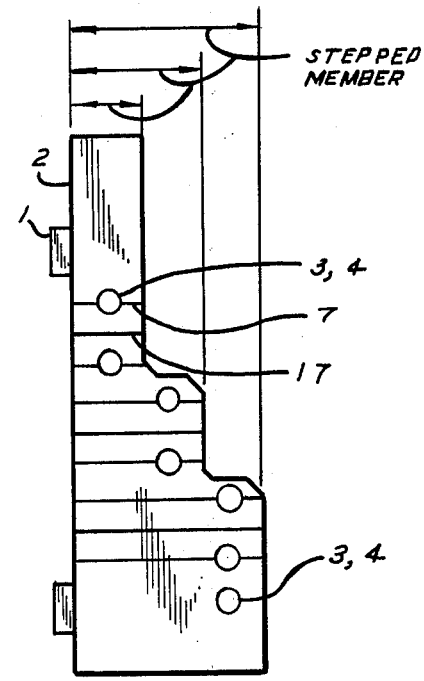
FIG. 25b is a side view of FIG. 25 and shows the guide hole member stepped away from the bottom surface of the base plate in relation to groups of plurality of guide holes to match a series of lumber thicknesses.

FIG. 14, through FIG. 22 show typical applications in which the Accu-Template may be used to provide mirror image dowel holes in two adjoining mating parts. With reference to FIG. 14 and FIG. 15 and the two intersecting frames in the upper left corner of a typical kitchen cabinet frame 14, the following sequence is prescribed. Step one, assemble and hold the parts of frame 14 in the desired location for final assembly ("dry run"), label each mating part A and B respectively, and imprint an alignment scribe mark 18 continuous from part A, across the joint and onto part B. Step two, with reference to FIG. 15, the Accu-Template (FIG. 9) is positioned and butt joined against the disassembled part A so that the arrow A, 6, on the top of the base plate 2 is in the direction of part A and is also on the surface marked A, whereby the alignment scribe mark 18 on part A now appears in the alignment port hole 8 and cut-out 9 and the Accu-Template can be adjusted so that the said alignment scribe mark 18 falls in line with an alignment port hole girth lines imprinted in the tapered or ramp surface of said port holes 8 or cut-outs 9 respectfully. The Accu-Template and work part A are now in proper orientation preparatory to drilling the first work part, and to insure said proper orientation, the Accu-Template is temporarily clamped to the work part with the C clamp configuration as shown in FIG. 18b or a common commercially available C clamp. The EZ clamp screw 11 is in position to clamp the work part A to the Accu-Template. With the Accu-Template clamped and aligned so that Indicia A 6 is arrowed and keyed to A on the work part, the drill bit is passed through the drill bit hole means 4, and through said guide holes 3,4 and into part A a distance of at least two diameters the size of the drill bit diameter. The operation of drilling the dowel holes in part A is now complete.

The next sequence of operation is the procedure for the alignment and subsequent drilling of the dowel holes in the opposite mating part B, and herein lies the main essence in defining the novelty of this invention and illustrates the use of the mirror image principle. FIG. 16 shows the Accu-Template transferred from part A to part B by translation and placed to butt against part B and lie over and on part marked B so that the arrow, B, 6, on the top base plate 2 is in the direction of part B and is also on the surface marked B, whereby the said alignment scribe mark 18 on part B now appears in the alignment port hole 8 and cut-outs 9 and the Accu-Template is adjusted so that the said alignment scribe mark 18 falls in line with an alignment port hole girth line 5 imprinted in the tapered or ramp surface of said port holes or cut-outs 9 respectively. The Accu-Template and work part are now in proper orientation preparatory to drilling the second work part, and to insure said orientation against movement, the Accu-Template is temporarily clamped to the work part with the C clamp configuration as shown in FIG. 18b or a common commercially available C clamp. With the Accu-Template aligned so that Indicia B 6, is "arrowed" 6 and keyed to B on the work part, the drill bit is passed in an opposite direction through the same drill bit guide hole means 3,4 and into part B a prescribed distance. The operation of drilling the second dowel hole in mirror image relation to the first drilled dowel hole is now complete. The two parts are now ready to receive the dowels and be reassembled. This completes the sequence of operations and use of the Accu-Template in drilling dowel holes in work parts to be joined in a side-to-side relation to one another.

For work parts to be joined in a non-planar right-angle relation to one another as shown with two boards in the upper right-hand corner of the kitchen cabinet structure FIG. 14, the sequence for drilling dowel holes is identical with the aforementioned procedure with the following exception. The EZ clamp is arranged in a "Z" configuration FIG. 5b and is attached to the Accu-Template as shown in FIG. 18 with means of an EZ attachment screw 14 and EZ clamp attachment screw threads on a selected corner of the Accu-Template 13. In this application, the EZ clamp FIG. 18a clamps the work part to the Accu-Template by using the drill bit guide hole member for the opposite side of the C clamp. This feature is particularly adaptable for use with thick boards, whereby the opening range of the EZ clamp can be extended with an EZ clamp extension 16 attached to the bottom of the EZ clamp frame 12. Otherwise, whereby thin boards are to be joined, a common C clamp can be used in a conventional manner and clamp the Accu-Template and work piece as shown in FIG. 18a. FIG. 15a shows another variation of the Accu-Template, whereby the extended portion of the drill bit guide hole member 1 is utilized to clamp the work part to the Accu-Template for drilling holes in boards to be joined in a right-angle relation to one another. Again the EZ clamp can be attached to the Accu-Template as previously described and used in the same manner.

Another advantage of the extended end portion of the said guide member is that one end is dissimilar to the other end and thereby aids the user in selecting the proper orientation of the Accu-Template in relation to the work part.

FIG. 22 through FIG. 25b shows an Accu-Template of slightly different configuration, and yet maintains all the salient features of previously discussed Accu-Templates. As shown, a variety of drill bit guide hole members 1 carries a plurality of drill bit guide holes, 3, with Alignment Indicia Aids 6, drill bit guide hole girth lines 5 and an attachable base 12 composed of two substantially rectangular base plates 2, all constituents of the Accu-Template are congruous with previously described similar matter. The main difference between the aforementioned Accu-Templates and FIG. 22 is noticed in the absence of an alignment port hole. In this presentation, the space between the said base plates 18 provides an overall alignment opening, similar to the aforementioned alignment port hole 8, wherein is imprinted an alignment part girth line 5, drill bit guide hole girth line 7, which serves in the same capacity as previously discussed procedures. The advantage of this configuration is best utilized wherein maximum useage of conventional C clamps is desired. Also, this Accu-Template can be manufactured cheaply, out of plastics and with steel inserts, in a myriad of combinations of guide hole members and drill bit guide hole diameters to accommodate the needs of a handyman or a skilled craftsman.

Although the aforementioned detailed description in conjunction with FIGS. 1–25b shows a number of embodiments of the invention using an assembly of at least two pieces and an EZ attachable clamp, and an L clamp it is to be understood that other assemblies utilizing more than said constituents may be made, as well as other embodiments may be made and incorporated as the results of considerations due to economics of production or marketing, which come within the scope and essence of the invention.

I claim:

1. A "T" shaped doweling jig comprising a substantially rectangular base plate having a top face with two parallel side edges, at least one alignment port hole formed through said top face, said alignment port hole having sides which taper in ramp-like configuration from a predetermined larger opening to a predetermined smaller opening, at least one ramp-like tapered cut-out formed in each of said side edges, at least one defined straight port hole girth line extending across said top face from one of said cut-outs to another of said cut-outs, said girth line bisecting said alignment port hole, a substantially rectangular drill bit guide hole member having a top surface with two parallel side edges with a thickness less than said predetermined smaller opening, at least one defined drill bit guide hole extending transversely through said guide hole member, at least one defined straight guide girth line extending transversely across said top surface from edge to edge, said guide hole girth line bisecting said guide hole, means for attaching said guide hole member to said base plate, said guide hole member being centrally and perpendicularly attached to said base plate to form said "T" shaped doweling jig and intersect said alignment port hole, wherein said means for attaching includes a parallel piped shaped shim having a predetermined thickness inserted between said base plate and said guide hole member, spacing said base plate from said guide hole member by a distance equal to the thickness of the shim, whereby said doweling jig is adapted to drill holes having an offset which is determined by the thickness of the shim, clamp means for attaching said doweling jig to a workpiece, and means for removably attaching said clamp means to said doweling jig.

2. A doweling jig in accordance with claim 1, wherein the thickness of said shim is tapered in a wedge shaped configuration, whereby said jig is adapted to drill holes having a tapered offset.

3. A doweling jig in accordance with claim 1, wherein said base plate has a plurality of alignment port holes with associated girth lines and cut-outs.

4. A doweling jig in accordance with claim 1, wherein said guide hole member is removably attached to said base plate and is selected from a plurality of guide hole members, each having a different configuration of drill bit guide holes with associated girth lines in a predetermined relationship.

5. A doweling jig in accordance with claim 1, wherein said shim is connected to said base plate and to said guide hole member by alignment pin means formed on said shim cooperating with pin receiving holes formed in said base plate and said guide hole member.

6. A doweling jig in accordance with claim 1, wherein said shim is provided with alignment girth lines.

7. A doweling jig in accordance with claim 1, wherein said clamp means comprises an "L" shaped clamp.

8. A doweling jig in accordance with claim 6, wherein said clamp means comprises a straight portion shaped clamp.

9. A doweling jig in accordance with claim 1, wherein said guide hole member has a portion protruding beyond both ends of said top face of the base plate to facilitate clamping of the doweling jig to the work piece.

10. A doweling jig in accordance with claim 1, wherein said guide hole member has dissimilar shaped ends which protrude beyond the edges of said base plate and is clamped to a work piece by standard "c" clamps located at the protruding ends of the guide hole member.

11. A doweling jig in accordance with claim 1, wherein said defined drill guide holes are guide bushing inserts.

12. A doweling jig in accordance with claim 1, wherein other alignment markings and indicia including lines, arrows, numbers, and letters are imprinted on said top face.

13. A doweling jig in accordance with claim 11, wherein said alignment markings and indicia are imprinted on said top face in decal form.

14. A doweling jig in accordance with claim 6, wherein said drill hole guide member has a plurality of guide holes which are displaced parallel from said base plate in a predetermined pattern and are stepped away from said base in general relation to match the center of a series of standard lumber thicknesses.

15. A doweling jig in accordance with claim 13, wherein said drill hole guide member is stepped in width parallel from said base plate in relation with said stepped guide holes.

16. A doweling jig in accordance with claim 1, wherein said alignment port hole is substantially oblong.

17. A doweling jig in accordance with claim 5, wherein said guide hole member has a thickness less than said rectangular base plate.

18. An Accu-Template in accordance with claim 1, whereby said base plate is comprised of two rectangular base plates, one end geometrically different from the other, attached centrally and perpendicular, one to each opposite end portion, in from said end a distance to provide sufficient end clamping space for holding the Accu-Template to the work part, and providing space there between to expose imprinted Alignment Indicias including arrows, letters, numbers imprinted on the top surface of the said drill bit guide member, whereas said AIA letters are imprinted asymmetrically on each end of the two base plates, whereby the space between the two plates is designated as an alignment part opening.

19. A doweling jig in accordance with claim 1, wherein said defined straight port hole girth line is identified with corresponding asymmetric indicies.

20. A doweling jig in accordance with claim 1, wherein said defined straight guide girth line is identified with corresponding asymmetric indicies.

* * * * *